(12) United States Patent
Chung et al.

(10) Patent No.: US 10,598,809 B2
(45) Date of Patent: Mar. 24, 2020

(54) DOWNHOLE ELECTROMAGNETIC SENSING TECHNIQUES

(71) Applicant: Schlumberger Technology Corporation, Sugar Land, TX (US)

(72) Inventors: Jung Kee Chung, Calgary (CA); Sameer Bhoite, Conroe, TX (US); Dean Homan, Sugar Land, TX (US); Edward Michael Tollefsen, Houston, TX (US); Jaroslav Dobos, Calgary (CA)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 56 days.

(21) Appl. No.: 15/622,197

(22) Filed: Jun. 14, 2017

(65) Prior Publication Data

US 2018/0003849 A1 Jan. 4, 2018

Related U.S. Application Data

(60) Provisional application No. 62/357,094, filed on Jun. 30, 2016.

(51) Int. Cl.
*G01V 3/20* (2006.01)
*G01V 3/02* (2006.01)
*G01V 3/38* (2006.01)

(52) U.S. Cl.
CPC .............. *G01V 3/20* (2013.01); *G01V 3/02* (2013.01); *G01V 3/38* (2013.01)

(58) Field of Classification Search
CPC ...... E21B 47/122; E21B 47/12; E21B 47/121; E21B 47/123; G01V 3/02; G01V 3/04; G01V 3/06; G01V 3/08; G01V 3/12; G01V 3/20; G01V 3/22; G01V 3/24; G01V 3/26; G01V 3/28; G01V 3/36; G01V 3/38; G01V 3/34
USPC ...... 175/50; 324/323–375; 340/854.3–854.6, 340/853.1, 854.1, 870.41; 702/6, 7, 9
See application file for complete search history.

(56) References Cited

U.S. PATENT DOCUMENTS

| | | | |
|---|---|---|---|
| 5,736,860 A * | 4/1998 | Chaillout | G01V 3/28 324/339 |
| 8,308,199 B2 | 11/2012 | Camwell et al. | |
| 8,400,326 B2 | 3/2013 | Codazzi | |
| 8,648,733 B2 | 2/2014 | Dopf et al. | |
| 9,638,028 B2 * | 5/2017 | Gao | E21B 47/121 |
| 9,976,415 B2 * | 5/2018 | Logan | E21B 47/121 |
| 10,113,419 B2 * | 10/2018 | Wilson | E21B 47/122 |

(Continued)

FOREIGN PATENT DOCUMENTS

CA 2795482 C 7/2014

*Primary Examiner* — Steven L Yeninas

(57) ABSTRACT

An electromagnetic (EM) telemetry system includes an EM transmitter configured to transmit EM signals downhole and multiple sensors each configured to communicate with the EM transmitter and with another of the multiple sensors. Each sensor is placed a distance from another sensor along a length of a wellbore in the EM telemetry system. The EM telemetry system also includes a processor configured to select two or more sensors of the multiple sensors based on a signal to noise ratio (SNR) of an EM signal received from the two or more selected sensors, a depth of the EM transmitter, or both.

11 Claims, 10 Drawing Sheets

(56) References Cited

U.S. PATENT DOCUMENTS

| | | | | |
|---|---|---|---|---|
| 2011/0017512 A1* | 1/2011 | Codazzi | ............... | E21B 47/122 |
| | | | | 175/40 |
| 2011/0309949 A1* | 12/2011 | Dopf | ................... | E21B 17/003 |
| | | | | 340/854.6 |
| 2015/0145687 A1* | 5/2015 | Roberts | ............... | E21B 47/122 |
| | | | | 340/853.2 |
| 2016/0032717 A1* | 2/2016 | Parker | .................... | E21B 47/01 |
| | | | | 367/7 |
| 2017/0328195 A1* | 11/2017 | Wilson | ................ | E21B 47/122 |
| 2018/0003042 A1 | 1/2018 | DePavia et al. | | |
| 2018/0003043 A1 | 1/2018 | Gelman et al. | | |
| 2018/0003044 A1 | 1/2018 | Kusuma et al. | | |
| 2018/0003527 A1 | 1/2018 | Jarrot et al. | | |

\* cited by examiner

DOWNHOLE ELECTROMAGNETIC SENSING TECHNIQUES

CROSS-REFERENCE TO RELATED APPLICATION

This application claims priority to and the benefit of U.S. Provisional Patent Application No. 62/357,094, filed on Jun. 30, 2016, the entirety of which is incorporated herein by reference.

BACKGROUND

Conventional electromagnetic ("EM") telemetry employs two or more stakes (i.e., electrodes) placed in the ground to detect a signal. The signal may include an electrical current, and the current may cause a voltage differential between the stakes due to the resistivity of the ground. The signal includes an EM telemetry portion that is transmitted from a downhole tool in a wellbore. The EM telemetry portion includes encoded measurement data captured by the downhole tool. The signal also includes an electrical noise portion due to equipment (e.g., motors, generators, pumps, etc.) at the surface. It is oftentimes difficult to distinguish the EM telemetry portion of the signal from the electrical noise portion of the signal. To make matters more difficult, the EM telemetry portion of the signal is largely attenuated by the subterranean formation between the downhole tool and the stakes at surface. Furthermore, there may be other EM telemetry tools interfering with the desired signal.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

An electromagnetic (EM) telemetry system includes an EM transmitter configured to transmit EM signals downhole and multiple sensors each configured to communicate with the EM transmitter and with another of the multiple sensors. Each sensor is placed a distance from another sensor along a length of a wellbore in the EM telemetry system. The EM telemetry system also includes a processor configured to select two or more sensors of the multiple sensors based on a signal to noise ratio (SNR) of an EM signal received from the two or more selected sensors, a depth of the EM transmitter, or both.

In another embodiment, an insulating device configured to electrically insulate sensors in an electromagnetic (EM) telemetry system includes a first conductive sub and a second conductive sub, each comprising a threaded surface configured to fit with the other. The device includes an insulation structure between the first and second conductive subs and a conductor channel disposed across the insulation structure and between a first electronic pocket in the first conductive sub and a second electronic pocket in the second conductive sub. The conductor channel is configured to alter the electrical potential of the first sub.

Another embodiment of an insulating device configured to electrically insulate sensors in an electromagnetic (EM) telemetry system is disclosed. The device includes a first conductive sub and a second conductive sub, each comprising a threaded surface configured to fit with the other. The device also includes an insulation structure between the first and second conductive subs and a conductor channel disposed through the second conductive sub and through the insulation structure and between the first conductive sub and the second conductive sub. The conductor channel is configured to alter the electrical potential of the first conductive sub.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that the disclosure may be practiced without these specific details. In other instances, well-known methods, procedures, components, circuits, and networks have not been described in detail so as not to obscure aspects of the embodiments.

The terminology used in the description herein is for the purpose of describing particular embodiments and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Figure 1:
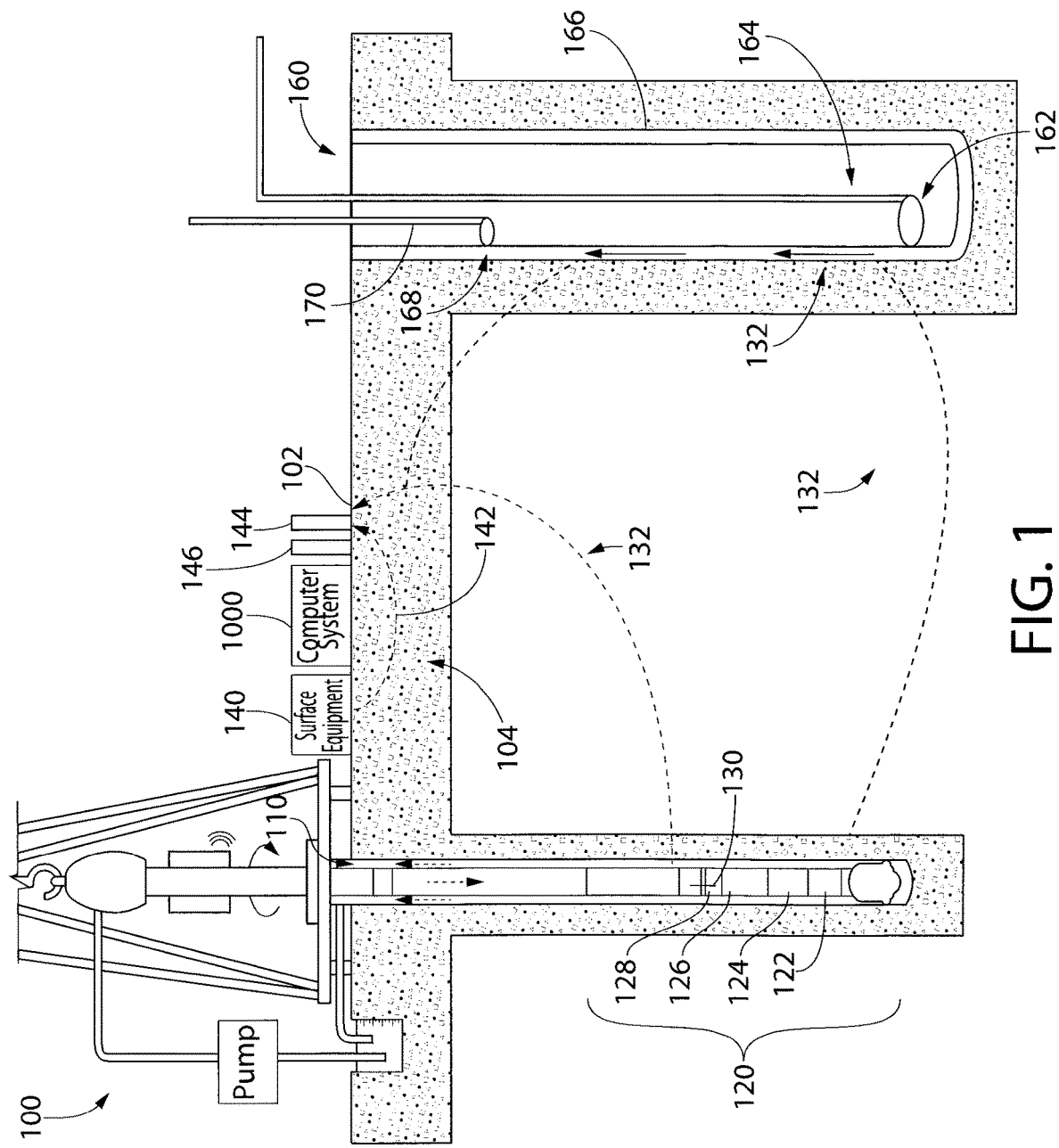
FIG. 1 illustrates a schematic side view of first and second wellbores in a subterranean formation, according to an embodiment.

FIG. 1 illustrates a schematic view of an EM telemetry system 100 in a wellsite having a first wellbore 110 and a second wellbore 160 formed in a subterranean formation 104, according to an embodiment. The first wellbore 110 may have a downhole tool 120 positioned therein. The downhole tool 120 may be or include a rotary steerable system ("RSS") 122, a motor 124, one or more logging-while-drilling ("LWD") tools 126, one or more measurement-while-drilling ("MWD") tools 128, or a combination thereof. The LWD tool 126 may be configured to measure one or more formation properties and/or physical properties as the first wellbore 110 is being drilled or at any time thereafter. The MWD tool 128 may be configured to measure one or more physical properties as the first wellbore 110 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 126 may be sent to the MWD tool 128. The MWD tool 128 may then group the sets of data from the LWD tool 126 and the MWD tool 128 and prepare the data for transmission to the surface 102.

The data may be transmitted to the surface via electro-magnetic ("EM") telemetry, mud pulse telemetry, or the like. When using EM telemetry to transmit the data from the downhole tool 120 in the first wellbore 110 to the surface 102, a coding method is used. For example, a predetermined carrier frequency may be selected and any suitable modulation method, e.g., phase shift keying ("PSK"), frequency shift keying ("FSK"), continuous phase modulation ("CPM"), quadrature amplitude modulation ("QAM"), or orthogonal frequency division multiplexing ("OFDM"), may be used to superpose the bit pattern onto the carrier wave. In another embodiment, a baseband line code, e.g., pulse position modulation, Manchester coding, biphase coding, or runlength limited codes such as 4b/5b or 8b/10b coding, may be used to superpose the bit pattern onto a waveform suitable for transmission across the MWD channel. This coded signal is applied as a voltage differential across an electrical insulation layer (e.g., ceramic, peek, hard plastic) 130 positioned between upper and lower portions of the downhole tool 120. Due to the voltage differential, an EM telemetry signal (e.g., electrical current) 132 is generated that travels through the subterranean formation 104. More particularly, the EM telemetry current density signal 132 travels from the lower portion of the downhole tool 120, out into the subterranean formation 104, and bends back toward the upper portion of the downhole tool 120, in an almost semi-elliptical like-shape as determined by the boundary conditions of the subterranean formation 104. The EM telemetry signal 132 from the downhole tool 120 may become attenuated proceeding away from the downhole tool 120 (e.g., upward toward the surface 102) due to the resistivity of the subterranean formation 104. More particularly, the EM telemetry signal 132 may be attenuated in highly conductive portions of the subterranean formation 104, which may shunt the EM telemetry signal 132, and/or the EM telemetry signal 132 may be attenuated by highly resistive portions of the subterranean formation 104, which may restrict the flow of the EM telemetry signal 132 to the surface 102.

Surface equipment may 140 be positioned at the surface 102. The surface equipment 140 may be or include a motor, a generator, a pump, or the like. The surface equipment 140 may be poorly grounded to one-another, which may introduce noise signals (e.g., electrical current) 142 into the subterranean formation 104 near the surface 102. The noise signals 142 from the surface equipment 140 may become attenuated proceeding away from the surface equipment 140 due to the resistivity of the subterranean formation 104. Thus, in one example, the noise signals 142 from the surface equipment 140 may become more and more attenuated proceeding downward, deeper into the subterranean formation 104.

In one embodiment, one or more surface sensors (two are shown: 144, 146) may be positioned at the surface 102. The surface sensors 144, 146 may be or include metallic stakes driven into the surface 102. Although not shown, one of the surface sensors (e.g., sensor 144) may be coupled to a blow-out preventer ("BOP") of the first wellbore 110. The surface sensors 144, 146 may measure the EM telemetry signal 132 and the noise signal 142 in the subterranean formation 104. The signals 132, 142 measured by the surface sensors 144, 146 may have an EM telemetry portion (e.g., from the EM telemetry signal 132 transmitted from the downhole tool 120), and an electrical noise portion (e.g., from the noise signal 142 generated by the noise-generating equipment 140 at the surface 102).

The surface sensors 144, 146 may detect/measure the signals 132, 142 in the subterranean formation 104. A voltage differential may then be determined between the surface sensors 144, 146 using the signals 132, 142 and the resistance between the surface sensors 144, 146. The resistance may be due to the resistivity of the subterranean formation 104. The resistance between the surface sensors 144, 146 is oftentimes from about 25 ohms to about 100 ohms (e.g., about 50 ohms).

The signals 132, 142 (e.g., current or voltage differential) may be transmitted from the surface sensors 144, 146 to a computer system 1000. The signals 132, 142 (e.g., current or voltage differential) received by the computer system 1000 may include an EM telemetry portion from the downhole tool 120 and an electrical noise portion from the surface equipment 140. The computer system 1000 may identify and decode the EM telemetry portion to recover the properties measured by the downhole tool 120. Both signals 132, 142 may be travelling in a substantially-horizontal direction proximate to the surface 102 when detected by the surface sensors 144, 146, causing the electrical noise portion to be "electrically-coupled" to the EM telemetry portion. This may make it difficult to distinguish the EM telemetry portion from the electrical noise portion.

To improve the signal-to-noise ratio ("SNR") between the EM telemetry portion and the electrical noise portion, a first sensor 162 may be positioned in the second wellbore 160. The second wellbore 160 may be laterally-offset from the first wellbore 110 from about 10 m to about 100 m, about 100 m to about 500 m, about 500 m to about 1000 m, about 1000 m to about 3000 m, or more. The first sensor 162 may be or include an electrode, a magnetometer, a capacitive sensor, a current sensor, a Hall-effect sensor, a toroid, a solenoid, a resistive gap, or a combination thereof. The first sensor 162 may be placed in a substantially vertical portion of the second wellbore 160, a lateral portion of the second wellbore 160, or in the heel therebetween. In one example, the first sensor 162 may be placed in a lateral portion of the second wellbore 160 that is extending toward the first wellbore 110. The depth of the first sensor 162 may be greater than or equal to the depth of the downhole tool 120, as measured vertically from the surface 102; however, in other embodiments, the depth of the first sensor 162 may be less than the depth of the downhole tool 120. A first insulated cable 164 may be coupled the first sensor 162. The first cable 164 may be configured to transmit the measurements captured by the first sensor 162 to the surface 102.

The second wellbore 160 may be "open-hole" or have a casing 166 positioned therein. When the second wellbore 160 has the casing 166 (or other metallic tubular member) positioned therein, the first sensor 162 may be in contact with the casing 166. In other embodiments, the first sensor 162 may not be in direct contact with the casing 166 and may instead sense the EM telemetry signal 132 through a liquid (e.g. brine) or through other means such as a magnetometer, capacitive coupling, etc. at a point in the second wellbore 160.

At least a portion of the EM telemetry signal 132 from the downhole tool 120 in the first wellbore 110 may be measured by the first sensor 162 in the second wellbore 160. For example, the EM telemetry signal 132 may flow into the casing 166 in the second wellbore 160, and the first sensor 162 may measure the EM telemetry signal 132 in the casing 166 proximate to the first sensor 162. The measurement data from the first sensor 162 may be transmitted up to the surface 102 through the cable 164 in the second wellbore 160.

Once the EM telemetry signal 132 reaches the casing 166 in the second wellbore 160, at least a portion of the EM telemetry signal 132 may flow up the casing 166 in the second wellbore 160 toward the surface 102, which is the path of least resistance. A second sensor 168 may be configured to measure the EM telemetry signal 132 at a different location than the first sensor 162. As shown, the second sensor 168 is positioned within the second wellbore 160 and above the first sensor 162. In another embodiment, the second sensor 168 may be positioned at the surface 102 proximate to the top of the second wellbore 160 (e.g., coupled to a wellhead or BOP of the second wellbore 160). The second sensor 168 may also be or include an electrode, a magnetometer, a capacitive sensor, a current sensor, a Hall-effect sensor, a toroid, a solenoid, a resistive gap, or a combination thereof. The second sensor 168 may be in contact with the casing 166 in the second wellbore 160 or in contact with an intermediate conductive member that is in contact with the casing 166 in the second wellbore 160, to enable the second sensor 168 to detect the EM telemetry signal 132 at that location. A second insulated cable 170 may be coupled the second sensor 168. The second cable 170 may be configured to transmit the measurements captured by the second sensor 168 to the surface 102.

As will be appreciated, the EM telemetry signal 132 flowing through the casing 166 at the location of the first and second sensors 162, 168 may be different. For example, the EM telemetry signal 132 measured by the second sensor 168 may be smaller than the EM telemetry signal 132 measured by the first sensor 162 because a portion of the EM telemetry signal 132 "leaks" back to the downhole tool 120 through the subterranean formation 104 before reaching the second sensor 168. This leaking effect may be more pronounced for casing materials that are less conductive or where a joint between two casing joints introduces a series resistance. In addition, the first and second sensors 162, 168 may also be affected differently by the noise signals 142 produced by the surface equipment 140. For example, the noise signals 142 that reach the first sensor 162 may be smaller than the noise signals 142 circulating in proximity to the second sensor 168 due to the additional distance (and corresponding resistance) that the noise signal 142 travels to reach the first sensor 162. Said another way, as depth of the downhole tool 120 increases, the amplitude of the noise signals 142 from the surface 102 may be reduced due to shunting of the noise current loops in the conductive formations and attenuation due to interleaved resistive layers.

As the downhole tool 120 drills deeper into the subterranean formation 104, the EM telemetry signal 132 transmitted by the downhole tool 120 may be attenuated on its path to the surface 102. This attenuation is greater in highly-conductive formations that shunt the EM telemetry signal 132 and can be worsened by the presence of highly resistive layers which restrict the flow of the EM telemetry signal 132 to the surface 102.

A distance between the first and second sensors 162, 168 may be known. The distance may be, for example, from about 10 m to about 50 m, about 50 m to about 100 m, about 100 m to about 250 m, about 250 m to about 500 m, about 500 m to about 1000 m, or more. While it was previously assumed that the resistance between two points on the casing 166 was zero or close to zero, over larger distances, the resistance is no longer nominal. As a result, with the distance known, the resistance of the casing 166 between the first and second sensors 162, 168 may be determined. The resistance may be, for example, from about 0.1 ohms per 1000 m to about 5 ohms per 1000 m, from about 0.2 ohms per 1000 m to about 2 ohms per 1000 m, or from about 0.3 ohms per 1000 m to about 1 ohm per 1000 m. In one specific example, the resistance may be about 0.5 ohms per 1000 m. Thus, in one example, if there is 10,000 m of casing 166 between the first and second sensors 162, 168, the resistance may be about 5 ohms. At least a portion of the casing 166 may be substantially vertical, which may cause the EM telemetry signal 132 to flow in a substantially vertical direction. As a result, the EM telemetry signal 132 from the downhole tool 120 (e.g., the EM telemetry portion) may be substantially perpendicular to the noise signal 142 from the surface equipment 140 at the surface 102 (e.g., the electrical noise portion), which may reduce the electrical coupling between the two portions.

The first and/or second sensor 162, 168 may be positioned to maximize the EM telemetry signal 132 (e.g., current) that is measured. In addition, the first and/or second sensor 162, 168 may be positioned to maximize the resistive path that the EM telemetry signal 132 travels through. When the subterranean formation 104 is highly resistive, the first and/or second sensor 162, 168 may be positioned in a conductive layer of the subterranean formation 104 below a highly resistive layer.

The sensors 144, 146, 162, 168 may be positioned in and/or configured to detect signals from a single downhole tool 120 in a signal wellbore 110 or multiple downhole tools 120 in multiple wellbores 110, 160, etc. The sensors 144, 146, 162, 168 may operate on land or in marine environments. The sensors 144, 146, 162, 168 may communicate unidirectionally or bi-directionally. In some embodiments, the sensors 144, 146, 162, 168 may communicate with each other and/or with other components of the downhole tools 120 or EM telemetry system 100 to communicate in a full or partial duplex manner. For example, in some embodiments, the communication channels between the sensors 144, 146, 162, 168 may be used for full duplex operation and may communicate bi-directionally and simultaneously. The sensors 144, 146, 162, 168 may use automation, downlinking, noise cancellation, etc., and may operate with acquisition software and/or human operators.

Figure 2:
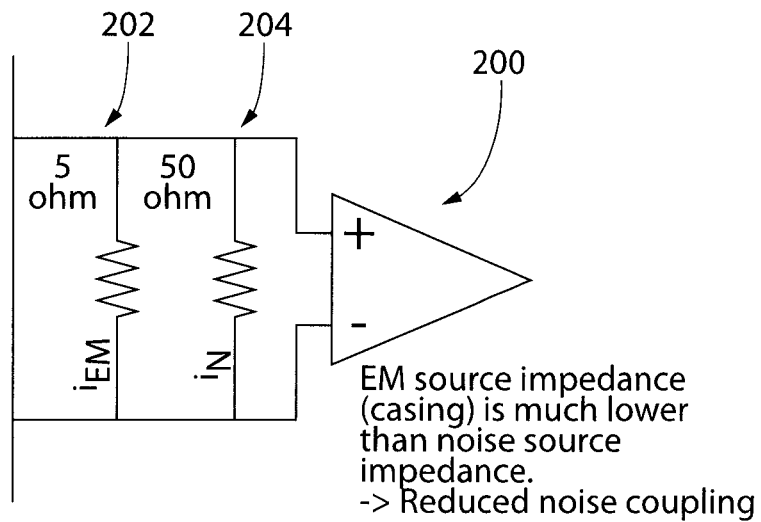
FIG. 2 illustrates a schematic view of an amplifier that receives signals from the first and second sensors, according to an embodiment.

FIG. 2 illustrates a schematic view of a differential amplifier 200 that measures the voltage difference across the sensors 162, 168, which can be electrodes in contact with the casing 166, according to an embodiment. The signals 132, 142 measured by the first and second sensors 162, 168 may be introduced into the differential amplifier 200 to generate the voltage differential. This embodiment reduces the noise that couples both the sensors 162, 168 (e.g., common mode noise). As shown, the impedance from the sensors 162, 168 to the input of the differential amplifier may be very low (e.g., equal to the casing resistance for that section of casing 166 for the example in which the sensors 162, 168 contact the casing 166). In this embodiment, the low source impedance provides high noise immunity as compared to a different embodiment that measures the differential signal between the sensor 162 and a stake placed at the surface 102. The latter embodiment may have higher impedance and also may couple the noise signals 142 from the surface equipment 140. In at least one embodiment, the impedance of the front end may be varied to match the resistance of the casing 166, which may be roughly known per unit of distance (e.g., meter).

The amplifier 200 may have a high common mode rejection ratio, which removes common mode noise. In addition to the common mode rejection benefit of multiple sensors 162, 168 in the second wellbore 160, the multiple sensors 162, 168 may provide the ability to capture the EM telemetry signal 132 from the downhole tool 120 throughout the full interval.

Figure 3:
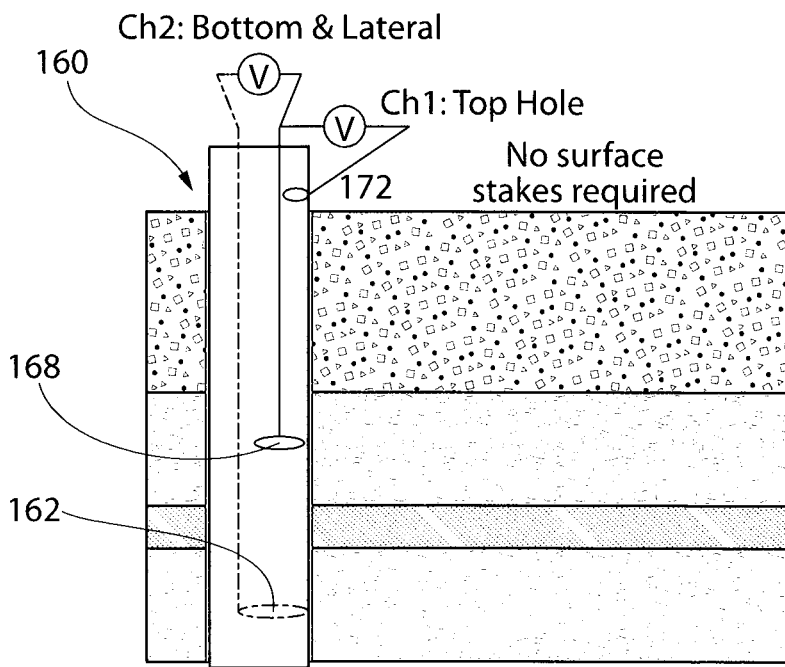
FIG. 3 illustrates a schematic side view of the second wellbore having three sensors, according to an embodiment.

FIG. 3 illustrates a schematic side view of the second wellbore 160 having three sensors 162, 168, 172, according to an embodiment. The third sensor 172 may be positioned proximate to the top of the second wellbore 160 (e.g., coupled to the casing 166, wellhead, or BOP). The second and third sensors 168, 172 may be used to measure the EM telemetry signal 132 from the downhole tool 120 when the downhole tool 120 is in a first, upper interval in the first wellbore 110 (e.g., when the depth of the downhole tool 120 is less than the depth of the second sensor 168). The first and second sensors 162, 168 may then be used to measure the EM telemetry signal 132 from the downhole tool 120 when the downhole tool 120 is in a second, lower interval in the first wellbore 110 (e.g., when the depth of the downhole tool 120 is greater than the depth of the second sensor 168). In one embodiment, the computer system 1000 may be or include a multi-channel acquisition system that uses the signals from the sensors 162, 168, 172 to remove noise with a noise-cancelation algorithm to maximize the SNR.

Figure 4:
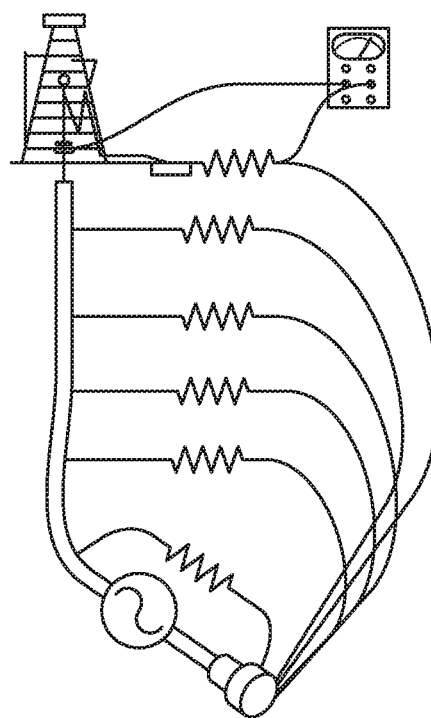
FIG. 4 illustrates a schematic side view of a wellsite showing an EM telemetry tool having dipoles, according to an embodiment.

FIG. 4 illustrates a schematic side view of a wellbore having an EM telemetry tool with downhole dipoles separated by electrical gaps. The transmitter to the gap is one pole, while the gap to the wellhead is another pole. The EM signal may be injected in the formation using this dipole. The EM signal may be sensed on the surface using surface antenna or stakes. The surface antenna or stakes are inserted into the ground, such that the EM signal traveling through the drill pipe constitutes high potential and the surface antenna constitutes low potential such that the surface bipole gets the signal. The process of transmitting an EM signal from downhole to the surface is referred to as EM uplink, while the transmission of EM signals from the surface to the downhole tool is referred to as downlink.

The demodulation of an EM signal is affected by the signal to noise ratio (SNR) in the EM signal frequency band. Rig activity generates unwanted electrical noise at the surface, and as drilling depth increases, EM signal amplitudes received at the surface weakens due to attenuation, whereas surface noise amplitude remains the same. This leads to reduced SNR as the drilling depth increases. Once SNR drops below a certain level, demodulating the EM signal at the surface may become very difficult.

In some embodiments, the arrangement of one or more downhole sensors, and the configuration of each downhole sensor, may reduce the effects of surface noise on the EM signals. For example, in some embodiments, multiple downhole sensors (i.e., receivers, electrodes, toroids, etc.) may be available for making multiple electrical contact points downhole. These multiple sensors may be configured such that during operation of the system, certain sensor pairs may be selected based on its impedance. For example, the sensors may be configured such that two downhole sensors having a signal with the highest SNR may be selected, thereby providing for more simplified and accurate decoding and demodulation.

Figure 5:
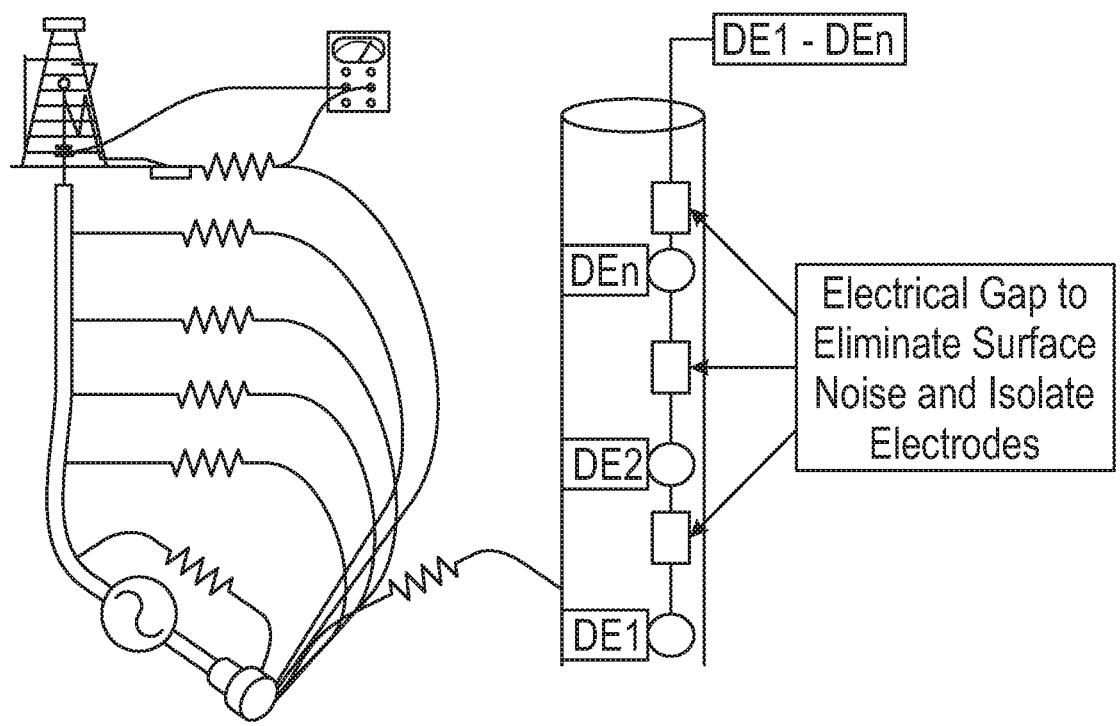
FIG. 5 illustrates a schematic side view of a wellsite showing an EM telemetry tool having dipoles, mapped to a schematic diagram of sensors and gaps, according to an embodiment.

FIG. 5 illustrates a schematic side view of a wellbore having an EM telemetry tool, as well as a schematic representation of the downhole sensors and electrically insulated gaps which isolate the sensors. Such a multi-contact EM telemetry system may include multiple conductors and may be deployed using wireline, with a MWD or LWD tool, or in any other suitable logging conveyance. The multi-contact EM telemetry system may have multiple sensors, each spaced a distance apart from another. For example, each sensors may be 500 ft to 3000 ft apart, or 1000 ft to 2000 ft apart, etc. The sensors may be different distances apart, and the distances between each sensor may further be adjustable, either before or after it is deployed downhole. In some embodiments, a suitable processor controller, such as surface acquisition software, may monitor the performance of the electrode pairs and dynamically choose one or more electrode pairs based a location of the transmitter (e.g., at the bit), and based on the signal obtained at the sensors.

In accordance with the present techniques, the multi-contact EM telemetry system may include spring loaded contact points which have continuous contact with the casing or open hole during its downhole deployment and operation. If an sensor pair separation is selected, the two sensors connected by a single conductor cable may be utilized as a standalone installation. At the rig site, the top electrode may be wired to the two wireline conductors, reducing the overall rig setup time.

Figure 6:
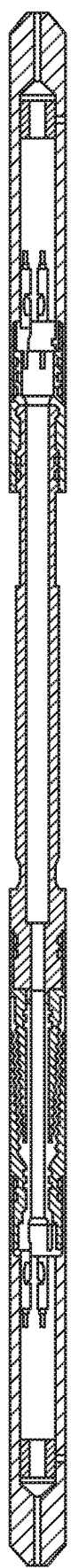
FIG. 6 illustrates a schematic view of an EM sensor, according to an embodiment.
Figure 7:
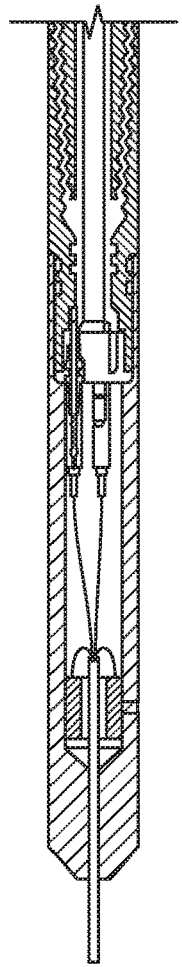
FIG. 7 illustrates a schematic side view of a connection for an EM sensor, according to an embodiment.
Figure 8:
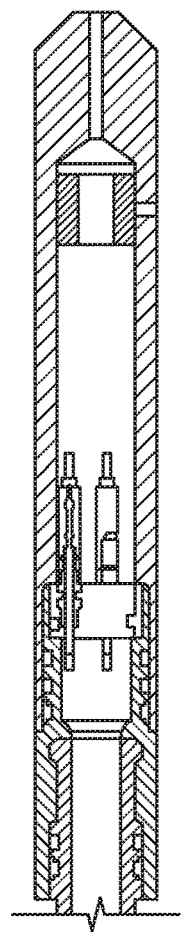
FIG. 8 illustrates a schematic side view of a connection for multiple EM sensors, according to an embodiment.

Each sensor may include mechanical wire clamp parts, electrical connection with pressure sealing parts, insulated gap joints parts, electrical connection to centralizer, centralizer that contacts formation/casing mechanically and electrically, electrical connection with pressure sealing parts, and other mechanical wires clamp parts, as illustrated in FIG. 6. As illustrated in FIG. 7, mechanical wire clamp parts may include cable head housing, clamps for mechanical connections, and electrical sockets with covered with rubber boot for pressure sealing. In some embodiments, by mating electrical connections, multi-conductor cable without armor may pass through the insulated gap joint and centralizer and connected to the other electrical connector which has same structure and pressure sealing function. A wire may be connected to the insulated gap joint to contact with the centralizer. Other wires may pass through the inside diameter for use in other electrode. As illustrated in the schematic sideview of FIG. 8, multiple sensor connections are possible by repeating the connections and configurations illustrated in FIGS. 6 and 7.

Figure 9:
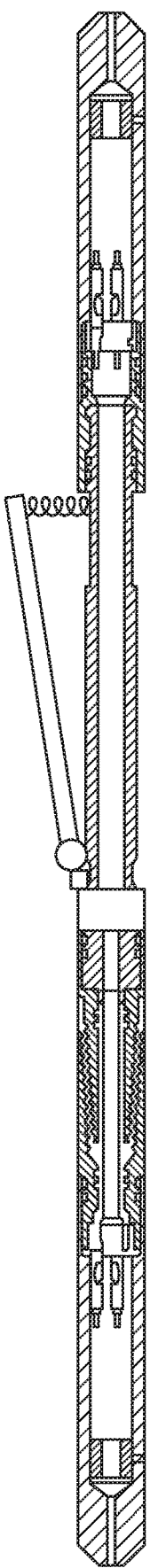
FIG. 9 illustrates a schematic side view of a cantilever arm for an EM sensor, according to an embodiment.

In some embodiments, surface power may be delivered (e.g., via wireline) to activate a motor downhole. This motor may use linear actuation mechanisms to energize a cantilever arm to make electrical contact with the casing or formation. To retrieve the electrode, mechanical springs may be used to retract the arm. The cantilever arm, as illustrated in FIG. 9, may be actuated by multiple linear to radial actuation mechanisms (e.g., cam, radial outward grooves to push the arm out, etc.).

Figure 10:
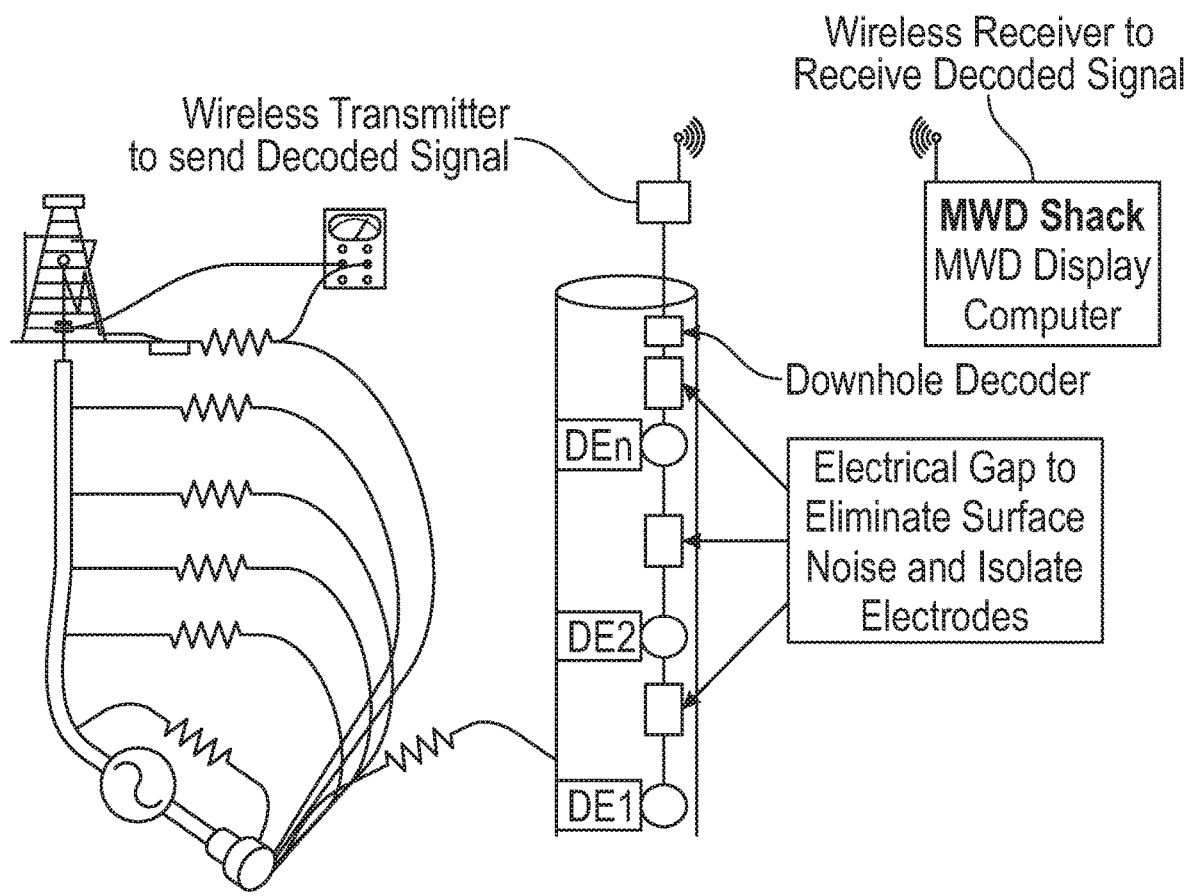
FIG. 10 illustrates a schematic side view of a wellsite showing an EM telemetry tool having dipoles, mapped to a schematic diagram of sensors and gaps and a downhole decoder, according to an embodiment.
Figure 11:
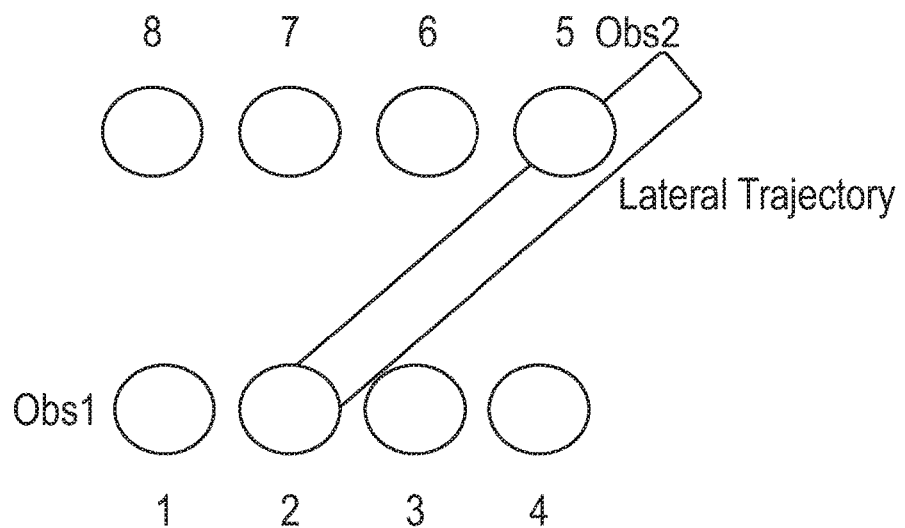
FIG. 11 illustrates a top schematic view of a wellsite having multiple selectable wells, according to an embodiment.

Furthermore, to further reduce the effects of surface noise, and as illustrated in FIG. 10, a downhole decoder and/or wireless transmitter may be used in some embodiments. The downhole decoder may reduce or remove noise for different deep electrode pairs and wirelessly transmit an electrode pair wellpair to the MWD computer for display. By decoding electrical signals downhole, potential noise may be reduced or removed. The wireless transmitter may be used to select wells for deployment of sensor arrays. For example, as illustrated in FIG. 11 representing a well pad with two observation wells, multiple sensor pairs may be installed in both observation wells. Depending on the drill bit depth, an electrode (and wellpair) may be selected for having a downlink or uplink signal with a suitable SNR.

In some embodiments, the electrically insulating gap sub used in the EM system may be configured to create a voltage difference across two electrically insulated elements of the sub. The gap sub may be conveyed using wireline, slickline, or coiled tubing, such that these conveyances may be passed through the gap sub and a repeater may be located in the piping string. In some embodiments, an electrical conductor may pass through a dielectric thermoplastic material. The voltage difference between the two electrically insulated elements of the sub may be controlled by applying a voltage to this electrical conductor from a cavity within the gap sub. The design may be used for short range EM communication in an EM system.

Figure 12:
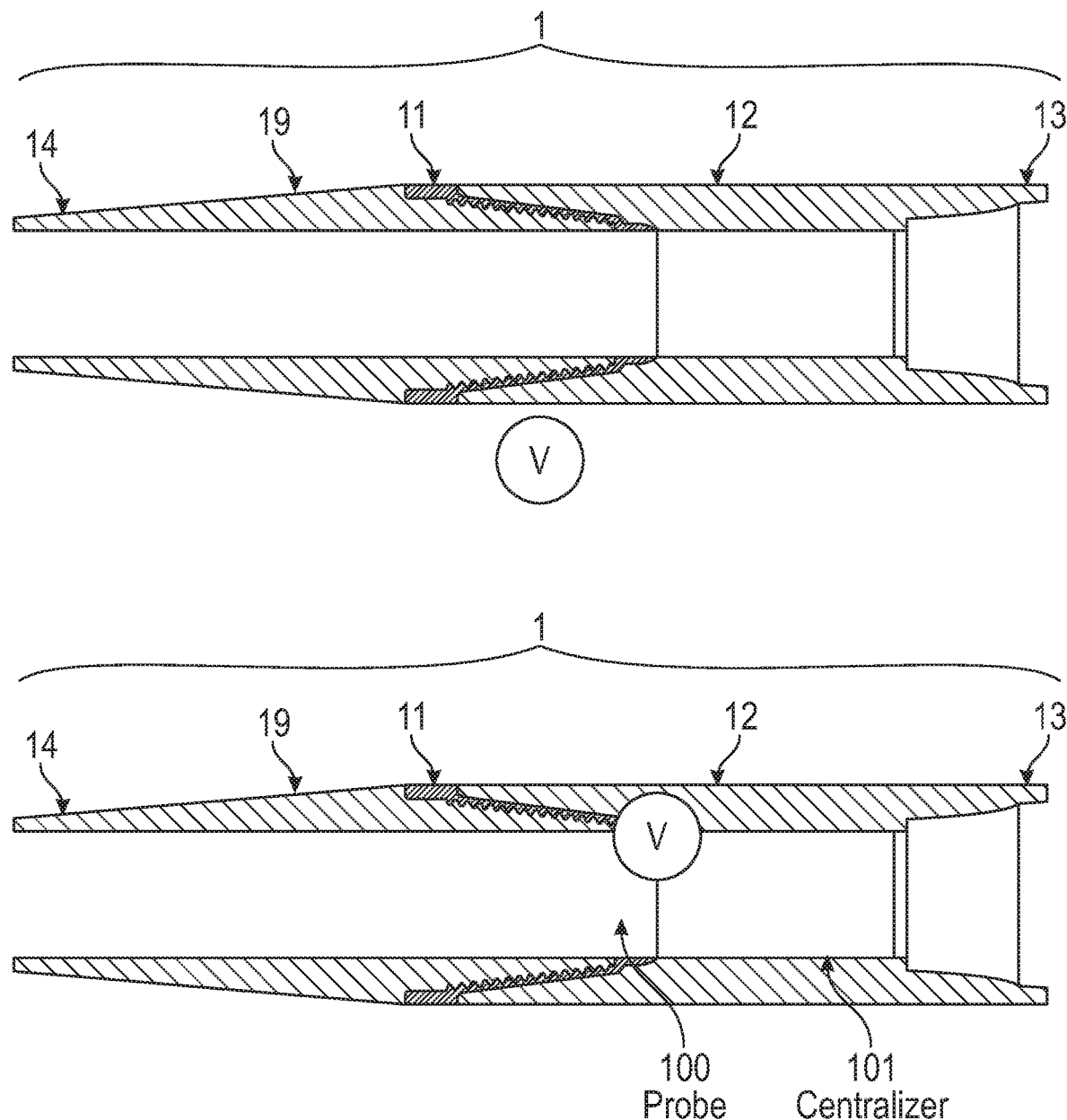
FIGS. 12-16 and 17A-D illustrate different configurations of insulation gaps in a gap sub for electrically isolating sensors in an EM telemetry system, according to an embodiment.
Figure 13:
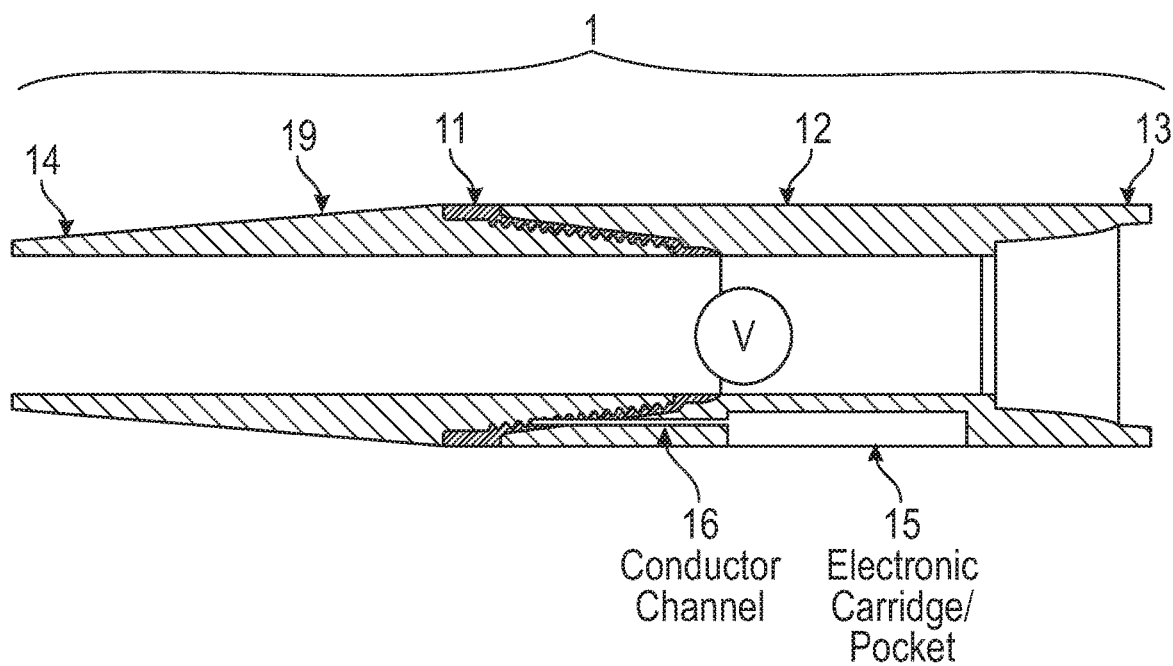
Figure 14:
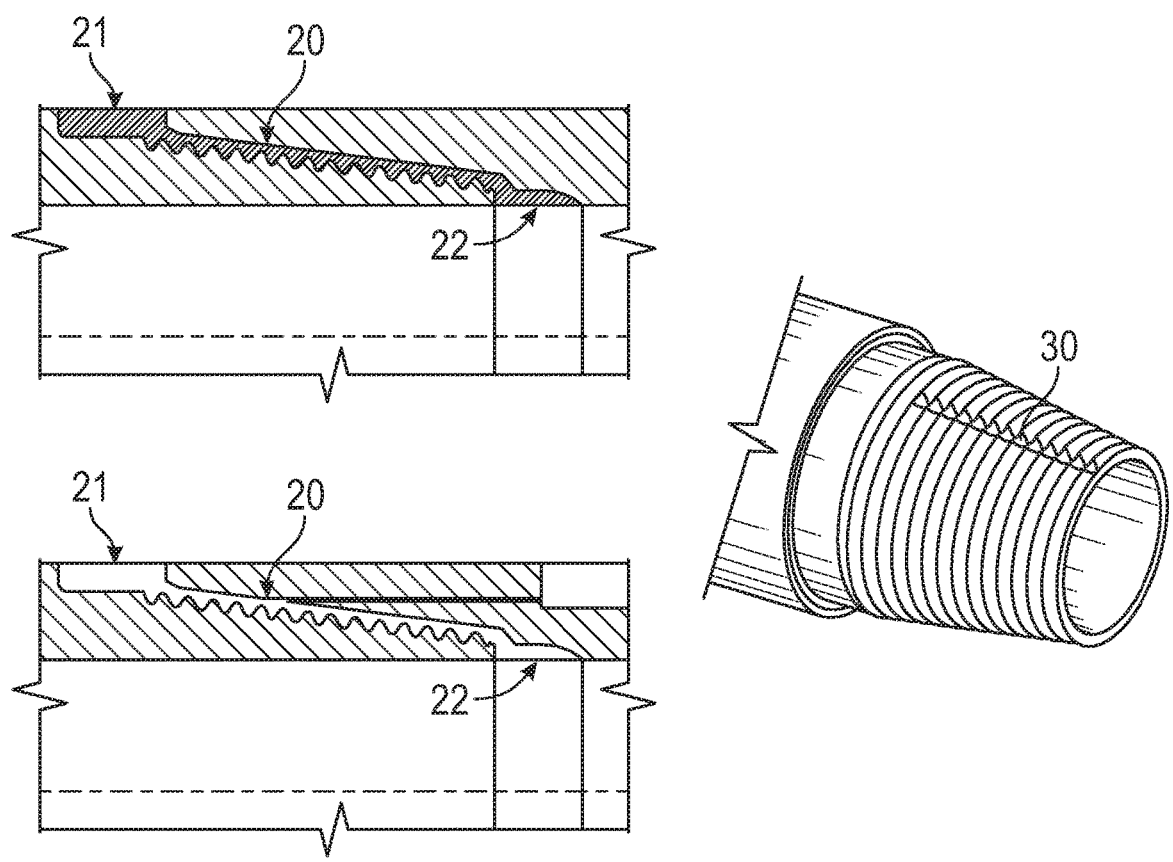

As illustrated in FIG. 12, a gap sub may include a male sub and a female sub which are electrically conductive, and an insulation between the male and female subs. The insulation gap may be filled with nonconductive plastic material (e.g., by injection). A probe may be configured in the gap sub to create a voltage difference across the gap sub through the metal centralizers in contact with the inner bore of the gap sub. A conductor channel may be created across the electrical insulation structure, as shown in FIG. 13, between an electronic pocket on one side of the insulation and the other side of the insulation. An insulated conductor inside the conductor channel may control the electrical potential of the male sub from the electronic cartridge. As there may be limited space between the male and female threads of the male and female subs, the relative positions of the two threads may not be controlled precisely. In some embodiments, a groove may be cut in the female thread in which the channel may terminate. As illustrated in FIG. 14, this may prevent the conductor from contacting both male and female subs at the same time, which would create a short between the two elements of the gap sub.

Figure 15:
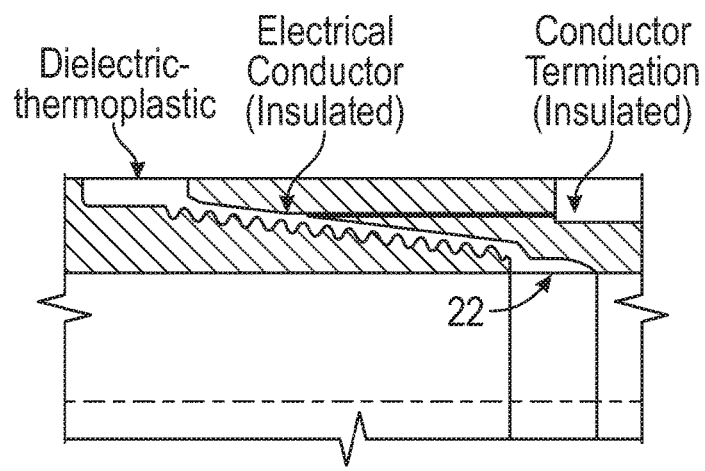
Figure 16:
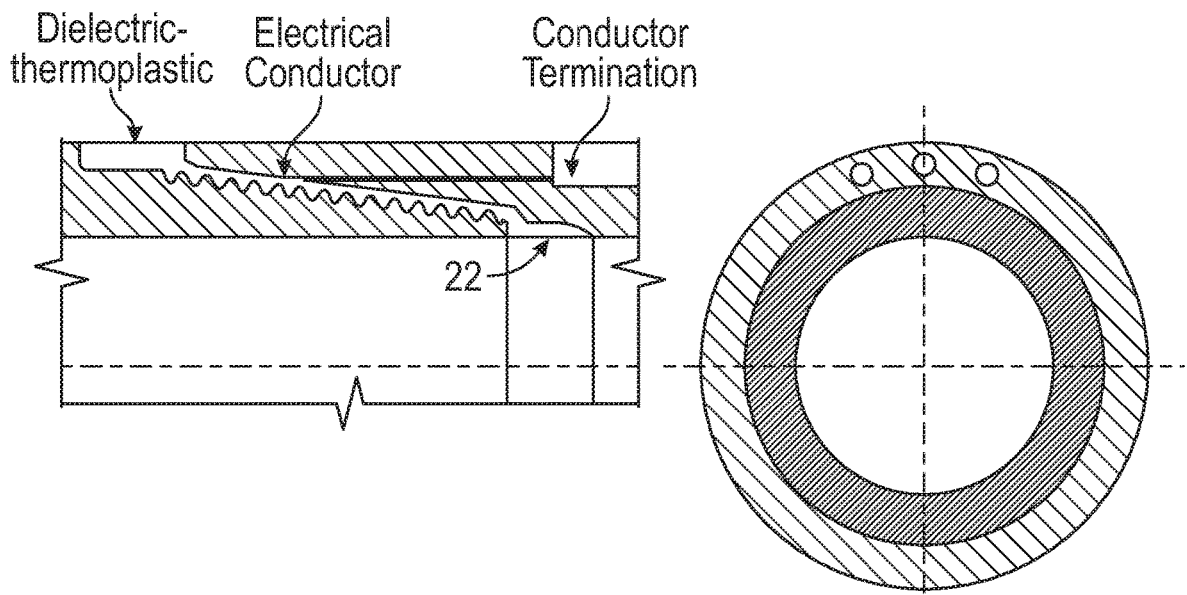

Once the male and female subs are assembled together, similarly to the current dry assembly process, an insulated electrical conductor may be run through the conductor channel until it contacts the male sub. The insulated electrical conductor may then be secured before the injection of the dielectric thermoplastic. Once the injection is complete, the electrical potential of the male sub may be controlled from the electronic pocket through an insulated conductor termination, as illustrated in FIG. 15. As illustrated in FIG. 16, several conductor channels may be created radially, if high currents are required to be passed through.

Figure 17A:
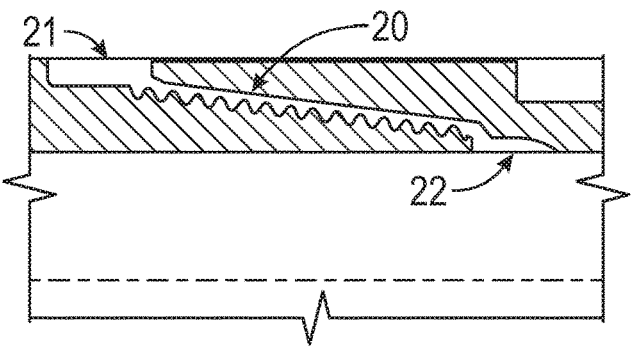
Figure 17B:
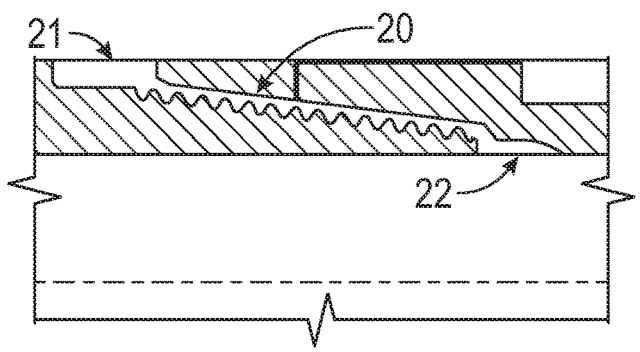
Figure 17C:
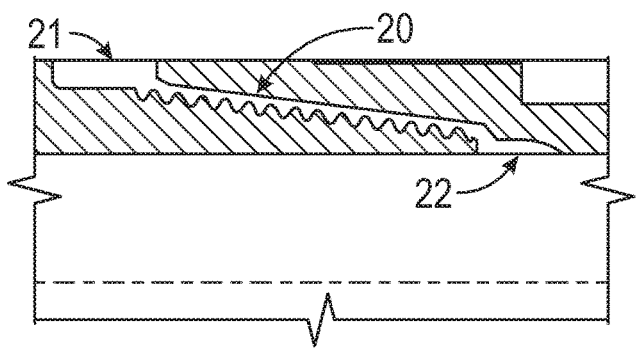
Figure 17D:
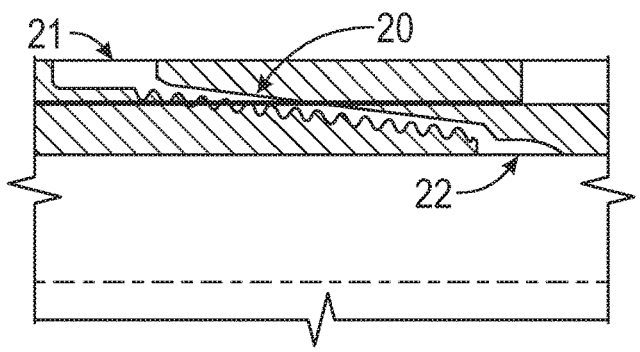

In accordance with the present techniques, variations of the conductor channel are possible by changing the location of the channel, in particular the distance to the center line and the angle from the center line anywhere from 0 to 180 degrees. The channel can be created before injection or after injection. For example, FIG. 17A shows a conductor channel created along the outer diameter of the sub, creating a groove parallel to the axis of the sub. The electrically insulated conductor may be positioned in the groove, such that it can be accessed and secured by potting or welding. FIG. 17B illustrates a configuration where the radial conductor channel is drilled through the female sub to go through the insulating structure and connect to the male sub. This embodiment may protect the structural integrity of the insulating structure on the outer diameter that is exposed to abrasion and shock while drilling. FIG. 17C illustrates another embodiment where an angular hole is drilled through the insulating structure. Additionally, FIG. 17D illustrates an embodiment drilling a conductor channel after thermoplastic injection.

In some embodiments, the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis modules 1002 that are configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor may include a microprocessor, microcontroller, processor module or subsystem, programmable integrated circuit, programmable gate array, or another control or computing device.

Figure 18:
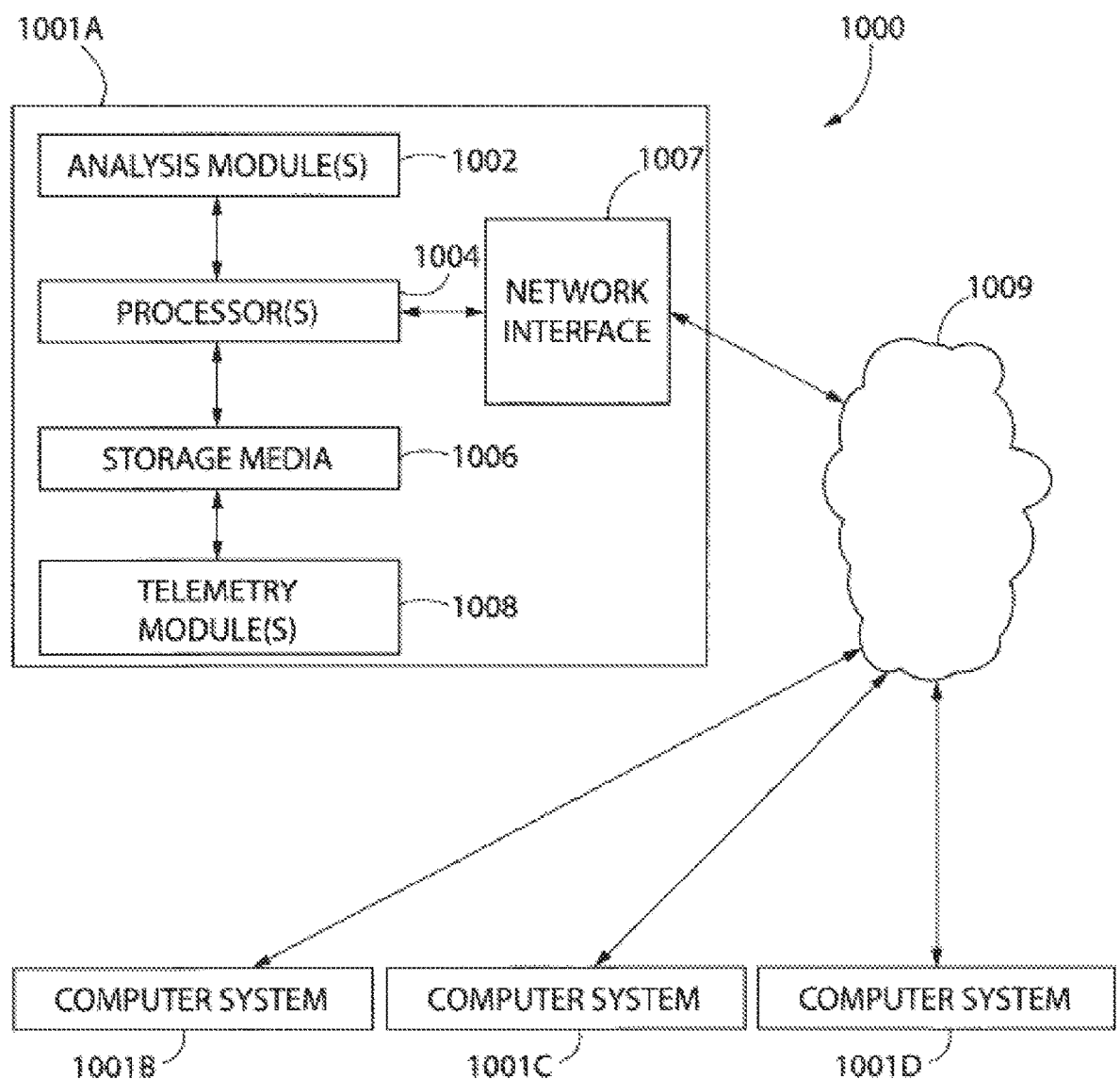
FIG. 18 illustrates a schematic view of a computing system for performing at least a portion of the methods, according to an embodiment.

The storage media 1006 may be implemented as one or more computer-readable or machine-readable storage media. Note that while in the example embodiment of FIG. 18 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1000 contains one or more telemetry module(s) 1008. The telemetry module(s) 1008 may be used to perform at least a portion of one or more embodiments of the methods disclosed herein (e.g., method 900).

It should be appreciated that computing system 1000 is one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the term "in contact with" refers to "in direct contact with" or "in contact with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain the principals of the disclosure and its practical applications, to thereby enable others skilled in the art to utilize the disclosure and various embodiments with various modifications as are suited to the particular use contemplated. Additional information supporting the disclosure is contained in the appendix attached hereto.

What is claimed is:

1. An electromagnetic (EM) telemetry system comprising:
   an EM transmitter configured to transmit EM telemetry signals downhole in a first wellbore;
   multiple sensors located downhole in a second wellbore, each configured to communicate with the EM transmitter and with another of the multiple sensors, wherein each sensor of the multiple sensors is placed a distance from another sensor along a length of the second wellbore in the EM telemetry system; and
   a processor configured to select two or more sensors of the multiple sensors based on a depth of the EM transmitter.

2. The EM telemetry system of claim 1, wherein the multiple sensors are each in contact with an electrically-conductive member in the second wellbore.

3. The EM telemetry system of claim 2, wherein the electrically-conductive member comprises a casing.

4. The EM telemetry system of claim 2, wherein one or more of the multiple sensors comprise spring-loaded contact points configured to contact the electrically-conductive member.

5. The EM telemetry system of claim 1, wherein the multiple sensors are each in contact with a formation in the second wellbore.

6. The EM telemetry system of claim 5, wherein one or more of the multiple sensors comprise spring-loaded contact points configured to contact the formation.

7. The EM telemetry system of claim 1, wherein one or more of the multiple sensors comprise wire clamp components, pressure sealing components, and insulated gap joints.

8. The EM telemetry system of claim 1, wherein one or more of the multiple sensors comprise a cantilever arm and a return spring configured to make contact with a wall in the second wellbore.

9. The EM telemetry system of claim 1, wherein the multiple sensors comprise electrodes, receivers, toroids, or combinations thereof.

10. The EM telemetry system of claim 1, wherein the EM telemetry system further comprises a downhole decoder configured to decode the EM telemetry signal.

11. The EM telemetry system of claim 10, wherein EM telemetry system further comprises a wireless transmitter to wirelessly transmit a decoded signal.

* * * * *